United States Patent [19]

Huebschen et al.

[11] Patent Number: 5,228,761
[45] Date of Patent: Jul. 20, 1993

[54] TOOL CHEST WITH SLIDING RETRACTABLE STEP

[75] Inventors: David A. Huebschen; George R. Slivon; Larry D. Pacetti, all of Kenosha, Wis.

[73] Assignee: Snap-on Tools Corporation, Kenosha, Wis.

[21] Appl. No.: 889,178

[22] Filed: May 27, 1992

[51] Int. Cl.$^5$ .................................... A47B 83/00
[52] U.S. Cl. ............................................ 312/235.1
[58] Field of Search ............... 312/235.1; 297/141, 297/142, 143; 182/91

[56] References Cited

U.S. PATENT DOCUMENTS

| | | |
|---|---|---|
| 1,118,584 | 11/1914 | Roebuck . |
| 2,495,374 | 1/1950 | Horn . |
| 3,481,429 | 12/1969 | Gaede . |
| 3,756,678 | 9/1973 | Kloppenstein . |
| 3,959,992 | 6/1976 | Eschenbach .................. 312/235.3 |
| 4,545,628 | 10/1985 | Richey . |

Primary Examiner—Kenneth J. Dorner
Assistant Examiner—Gerald A. Anderson
Attorney, Agent, or Firm—Emrich & Dithmar

[57] ABSTRACT

A tool cabinet has rollers depending from a bottom wall for rolling engagement with an underlying floor. A retractable step has depending legs and spring-loaded casters which support the step so that it can freely roll except when weight is placed on the step driving the legs into engagement with the floor. The step has a vertical slot in which is received a depending arm of an angle bracket which is fixed to a roller slide assembly mounted on the underside of the cabinet so that the step can be horizontally rolled between a stowed position beneath the cabinet and an extended position extending from beneath the cabinet and can move between raised and lowered positions when extended.

17 Claims, 2 Drawing Sheets

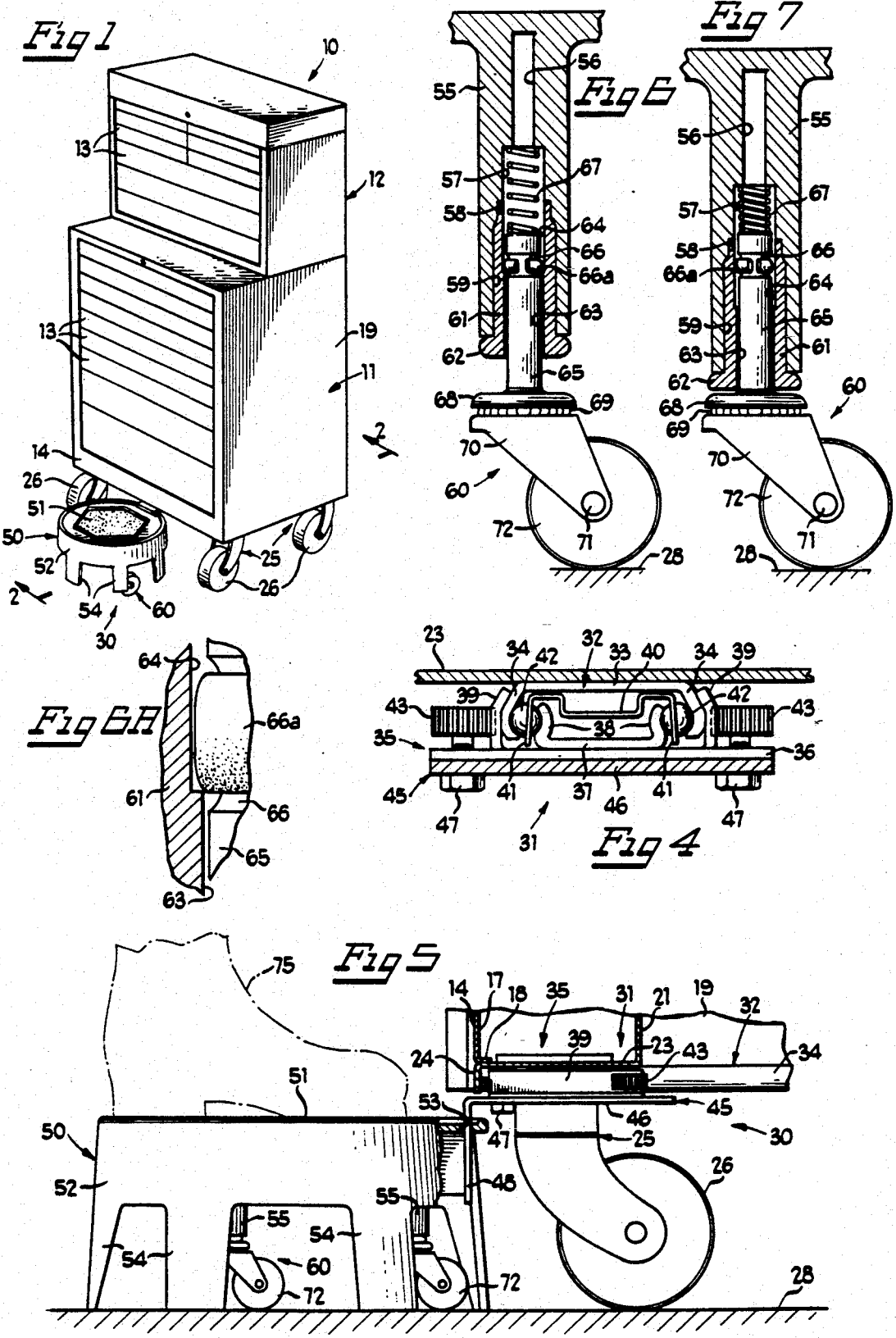

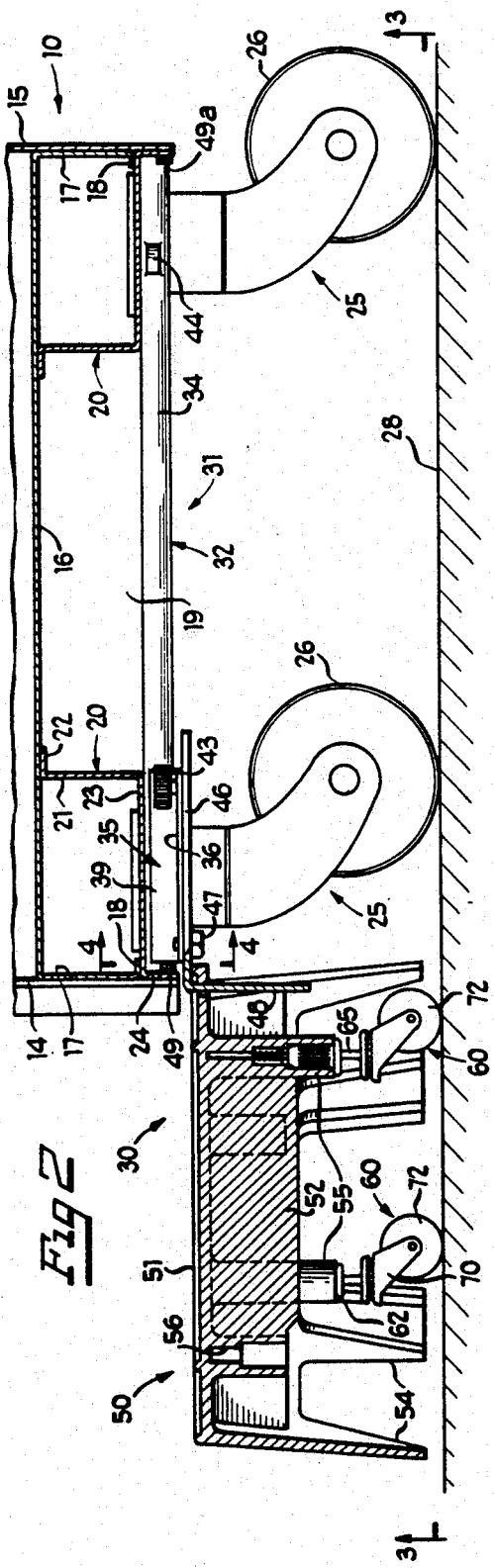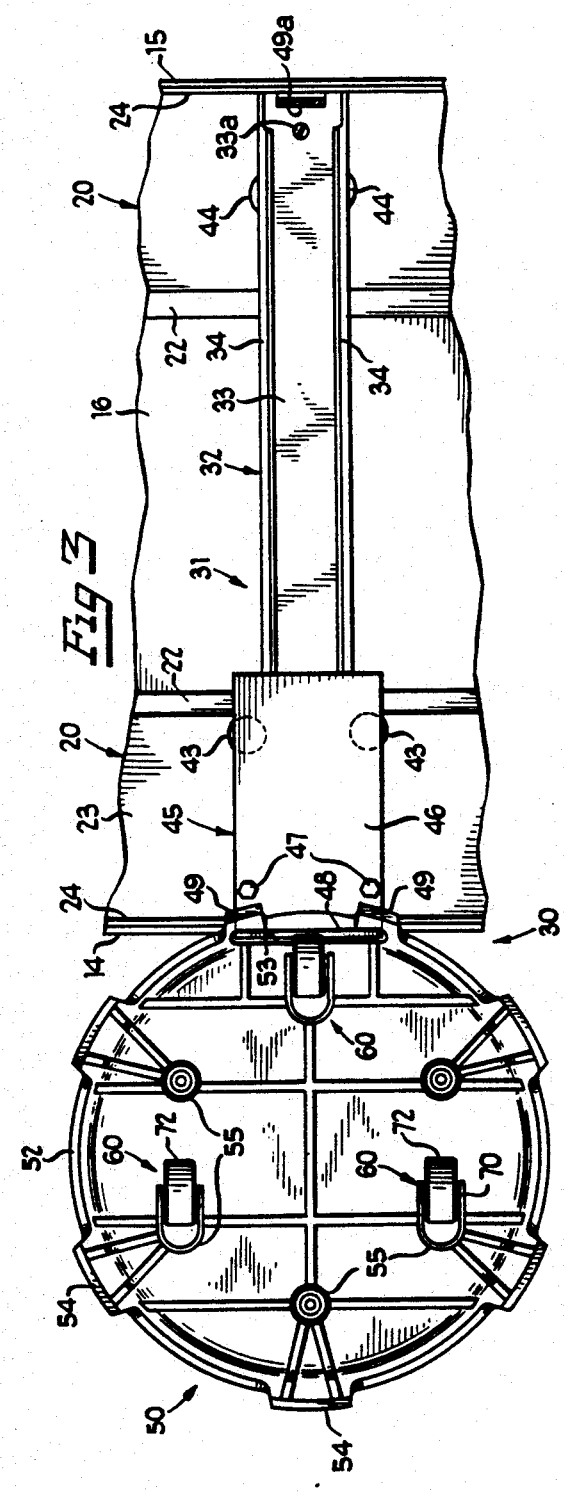

TOOL CHEST WITH SLIDING RETRACTABLE STEP

BACKGROUND OF THE INVENTION

1. Field of the Invention

The present invention relates to tool chests or cabinets of the type commonly used by mechanics and auto repair shops and, in particular, to relatively tall cabinets having a retractable step to facilitate access to the upper portions of the cabinet.

2. Description of the Prior Art

Tool chests or cabinets for the use of mechanics or the like are well known and are commonly used in auto repair facilities. Such tool cabinets are typically supported on wheels or rollers to facilitate movement about the floor of the work space. It is not uncommon for such tool cabinets to be large and, in particular, they may be five or six feet in height. In such tall cabinets it may be difficult for the mechanic to see into the upper drawers of the cabinet to determine the contents thereof.

Accordingly, it is known to provide a retractable step for such tool cabinets. One such step is disclosed in copending U.S. application Ser. No. 788,941, filed Nov. 7, 1991. That application discloses a step which is pivotally mounted beneath a cabinet on a spiral cam arrangement for movement between a stowed position beneath the cabinet and spaced from the floor and a use position extended from beneath the cabinet in contact with the floor. This arrangement requires the step to be supported by the cabinet except when disposed in its fully extended use position, and further requires very accurate design in mounting of the spiral cam so that the step just touches the floor when it reaches its fully extended position. Also, the pivoting or swinging radius of the step is such that it cannot be used with certain relatively narrow cabinets.

Another type of retractable step is disclosed in U.S. Pat. No. 4,545,628. That step is supported on a horizontal slide type mechanism which is hung from the bottom wall of the cabinet. The step support is provided with a spring-biased mechanism which maintains the step spaced above the floor until it is stepped on by the operator. However, this arrangement still requires that the step be supported by the cabinet and, in its extended position that it be cantilevered from the cabinet, until it is stepped on.

SUMMARY OF THE INVENTION

It is a general object of the invention to provide an improved retractable step and a cabinet incorporating same which avoid the disadvantages of prior cabinets and steps while affording additional structural and operating advantages.

An important feature of the invention is the provision of a retractable step assembly which is of relatively simple and economical construction and which accommodates easy movement between retracted and use positions.

In connection with the foregoing feature, it is another feature of the invention to provide a retractable step assembly of the type set forth in which the step is at all times supported on the floor.

In connection with the foregoing feature, another feature of the invention is the provision if a cabinet incorporating a step assembly of the type set forth, wherein the step assembly can readily roll with the cabinet wherever it is moved.

Another feature of the invention is the provision of a retractable step assembly of the type set forth which is usable with relatively narrow cabinets.

These and other features of the invention are attained by a retractable step assembly comprising: a step, coupling means coupled to the step and extending laterally therefrom, and retraction means connected to the coupling means and adapted to be connected to an associated overlying support surface and accommodating reciprocating generally horizontal movement of the step and the coupling means between extended and retracted positions, the coupling means including means accommodating generally vertical movement of the step relative to the retraction means between raised and lowered positions.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a perspective view of a tool cabinet incorporating the retractable step assembly of the present invention, with the step assembly disposed in its extended and raised position;

FIG. 2 is an enlarged, fragmentary view in vertical section taken along the line 2—2 in FIG. 1;

FIG. 3 is a fragmentary bottom plan view of the cabinet and step assembly of FIG. 2;

FIG. 4 is a further enlarged fragmentary view in vertical section taken along the line 4—4 in FIG. 2;

FIG. 5 is an enlarged, fragmentary side elevational view in partial section of the step assembly and the front portion of the cabinet of FIG. 1, with the step disposed in its lowered position;

FIG. 6 is a further enlarged fragmentary view in partial vertical section of one of the caster assemblies of the step of FIG. 2, with the step in its raised position;

FIG. 6A is a still further enlarged fragmentary view in partial section of the retaining means for the caster assembly of FIG. 6; and FIG. 7 is a view similar to FIG. 6 with the step disposed in its lowered position.

DESCRIPTION OF THE PREFERRED EMBODIMENT

Referring to FIGS. 1—3, there is illustrated a tool chest or cabinet 10 which has a relatively deep lower section 11 and a shallower upper section 12, each in the form of an open-front box-like housing with a plurality of drawers 13 therein. The lower section 11 has upstanding front and rear walls 14 and 15 and a pair of upstanding side walls 19, all interconnected at a point slightly above the lower end thereof by a flat, horizontal bottom wall 16. The bottom wall 16 is provided at its front and rear edges with dependent flanges 17 which are, respectively, fixedly secured to the front and rear walls 14 and 15, and are provided at their lower ends with laterally inwardly extending lips 18. The lower section 11 also includes a pair of angle beams or rails 20 disposed immediately below the bottom wall 16, respectively adjacent to the front and rear walls 14 and 15, the beams 20 being substantially mirror images of each other, so that only one will be described in detail. More specifically, each of the beams 20 has an upstanding vertical wall 21 provided at its upper end with a rearwardly (or forwardly) extending attachment flange 22 which is fixedly secured to the underside of the bottom wall 16. The vertical wall 21 is integral at its lower end with a horizontal wall 23 which extends forwardly (or rearwardly) beneath the lip 18 of the adjacent one of the bottom wall flanges 17, and is provided at its distal end with a depending attachment flange 24 which is fixedly secured to the inner surface of the adjacent one of the front or rear walls 14 and 15.

The cabinet 10 is supported on a plurality of caster assemblies 25, preferably four in number and arranged respectively adjacent to the four corners of the cabinet 10. More specifically, each of the caster assemblies 25 has a mounting plate which is fixedly secured to the horizontal wall 23 of the adjacent one of the angle beams 20, and is provided with a caster wheel 26 disposed for rolling engagement with the underlying floor 28 or other support surface in a known manner. Preferably, at least two of the caster assemblies 25 are swivel casters.

The cabinet 10 is provided with a retractable step assembly, generally designated by the numeral 30, constructed in accordance with the present invention. Referring also to FIGS. 4 and 5, the step assembly 30 includes a roller slide assembly 31 which is, essentially, in the nature of a standard drawer slide assembly. More specifically, the slide assembly 31 includes a generally channel-shaped outer track 32, which extends substantially the entire depth of the cabinet 10 between the front and rear walls 14 and 15 thereof, centrally thereof. The outer track 32 has an attachment wall 33 which is fixedly secured at the front and rear ends thereof to the horizontal walls 23 of the angle beams 20 by suitable fasteners 33a (one shown in FIG. 3), and is integral at its opposite sides with depending, arcuate flanges 34. The slide assembly 31 also includes a slider 35 including a flat, generally rectangular base plate 36 which carries, centrally thereof, a front-to-back extending inner track 37 having upstanding arcuate flanges 38 adapted to fit, respectively, inside the outer track flanges 34 and spaced laterally inwardly therefrom for cooperation therewith to define a pair of generally part-cylindrical channels. The central portions of the lateral side edges of the base plate 36 are turned upwardly to define upstanding outer retainer flanges 39 which, respectively, ride along the outer surfaces of the flanges 34 of the outer track 32. Disposed between the inner and outer tracks 37 and 32 is a cage 40 having flanges 41 which depend respectively in the channels between the facing flanges of the inner and outer tracks 37 and 32, each of the flanges 41 carrying a plurality of longitudinally spaced-apart roller balls 42 which are trapped in the channels between the track flanges 34 and 38 for rolling engagement therewith. Thus, it will be appreciated, that the roller slide assembly 31 affords very low-friction sliding movement of the slider 35 along the outer track 32, in a known manner.

The base plate 36 of the slider 35 carries at the rear end thereof a pair of upstanding cylindrical detent rollers 43, respectively disposed just outboard of the outer retainer flanges 39 with their axes disposed perpendicular to the base plate 36, the rollers 43 being dimensioned so as to be spaced a very slight distance from the outer surfaces of the outer track flanges 34. Each of the outer track flanges 34 is provided adjacent to its rear end with a laterally outwardly projecting detent boss 44 (FIGS. 2 and 3). Thus, when the slider 35 moves to its rearwardmost position, the detent rollers 43 respectively cam past the detent bosses 44 to retain the slider 35 in its rearwardmost position.

The step assembly 30 also includes a coupling bracket 45 which is essentially in the nature of an angle bracket, including a flat, horizontal plate 46 which is fixedly secured to the underside of the slider base plate 36 by suitable screws 47. The plate 46 is mounted with its forward end extending just slightly forwardly of the front end of the slider 35 and integral with a depending, substantially vertical flange 48. Preferably, resilient stops or bumpers 49 and 49a are respectively fixed to attachment flanges at the front and rear ends of the track 32 (see FIGS. 3 and 5) for engagement with the slider 35 to limit its forward and rearward movements.

The step assembly 30 also includes a step 50 which has a flat, circular top wall or tread 51 integral at its peripheral edge with a depending cylindrical skirt flange 52. Formed in the tread 51 closely adjacent to the periphery thereof is a rectangular slot 53 disposed generally along a chord of the tread 51. Integral with the skirt flange 52 at spaced-apart locations thereon are a plurality of depending legs 54. Also depending from the tread 51 inboard of the skirt flange 52 are a plurality of circumferentially spaced-apart tubular sockets 55. Referring also to FIGS. 6, 6A and 7, each of the sockets 55 has a axial bore 56 formed in the lower end thereof and provided with successively larger-diameter counterbores 57, 58 and 59.

Three retractable caster assemblies 60, which may be of the type disclosed, in copending U.S. application Ser. No. 889,499, filed May 27, 1992 and entitled "Retractable Caster Assembly", are respectively mounted in three of the sockets 55. Each of the caster assemblies 60 includes a tubular sleeve 61 which is dimensioned to be press-fitted into the counterbores 58 and 59 of the associated socket 55. The sleeve 61 has a radially outwardly extending annular flange 62 at its lower end which bears against the lower end of the socket 55. The sleeve 61 has an axial bore 63 therethrough with a slightly larger diameter counterbore 64 at its upper end. The caster assembly 60 includes a cylindrical stem 65 which is received in the bore 63 at the lower end of the sleeve 61. The stem 65 has a circumferential groove 66 formed in the outer surface thereof adjacent to its upper end, in which is seated a split retaining ring 66a. The retaining ring 66a has an at-rest outer diameter which is greater than the diameter of the bore 63, but the ring 66a is compressible into the groove 66 to permit insertion of the stem 65 in the sleeve 61. When the stem 65 has been inserted to the point where the retaining ring 66a enters the counterbore 64, the ring 66a expands to prevent accidental removal of the stem 65 from the sleeve 61. A helical compression spring 67 is seated in the counterbore 57 above the stem 65 and resiliently urges the step 50 and the caster assembly 60 vertically apart. The lower end of the stem 65 is integral with an annular horn or bell portion 68 which serves as part of a raceway for a ball bearing 69 seated in the upper end of a caster clevis 70, the legs of which are interconnected by a shaft 71 on which is rotatably mounted a roller wheel 72.

In use, it will be appreciated that the caster assemblies 60 support the step 50 on the underlying floor or support surface 28. The springs 67 of the caster assemblies 60 resiliently urge the step 50 upwardly to a normal raised position (extended position of the caster assemblies 60), illustrated in FIGS. 1, 2 and 6, in which the legs 54 are spaced from the floor 28. In this position, the step 50 can freely roll along the floor 28. When a user places his foot 75 on the step 50, the step 50 is depressed against the urging of the springs 67 to a lowered position (retracted position of the caster assembly 60), illustrated in FIGS. 5 and 7, wherein the legs 54 are in firm frictional engagement of the floor 28 to support the majority of the weight and to inhibit lateral movement of the step 50. In the preferred embodiment of the invention, the step 50 is provided with six sockets 55, including three short ones and three long ones. This is so that a single mold can be used to produce two different height steps. The taller one is shown and stops in the mold would be used to shorten the legs 54 for the shorter one. Three caster assemblies 60 are disposed in long or short ones of the sockets 55, depending on the height of the step 50.

It is a fundamental feature of the invention that the step 50 is coupled to the slide assembly 31 by the coupling bracket 45. More specifically, the depending flange 48 of the coupling bracket 45 is received through the slot 53 in the step tread 51, as is illustrated in FIGS. 1-3 and 5. Preferably, the dimensions of the slot 53 are only very slightly greater than those of the flange 48 so as to prevent any horizontal movement of the two relative to each other, while freely accommodating vertical movement of the step 50 between its lowered and raised positions. Since the coupling bracket 45 is fixedly secured to the slider 35, movement of the slider 35 between its rearward and forward positions is accompanied by a corresponding movement of step 50 between a stowed position (not shown) fully retracted beneath the cabinet 10 and a use position extended forwardly from beneath the cabinet 10, as illustrated in FIGS. 1-3 and 5. In this regard, the parts are so positioned that when the slider 35 is in its forwardmost position, substantially the entire step 50 projects from beneath the cabinet 10. An important feature of the invention is that during this reciprocating movement of the step 50 between its stowed and use positions it is fully supported on the caster assemblies 60 so as not to place undue strain on the slide assembly 31. In this regard, the caster assemblies 60 are preferably swivel casters so that the step 50 can readily follow movements of the cabinet 10 as it is rolled from place-to-place on the floor 28.

It will be appreciated that the detent rollers and bosses 43 and 44 will prevent accidental movement of the step 50 from its stowed or retracted position, but the rollers 43 will readily cam past the bosses 44 to permit a user to pull the step 50 forwardly to its extended position. In this regard, the user may simply insert his foot between adjacent ones of the legs 54 and hook it behind the skirt flange 52 to pull the step 50 forwardly. Because the step 50 moves in a reciprocating front-to-back fashion between its extended and retracted positions, it occupies only the width of the step 50 and, therefore, the retractable step assembly 30 can be used with cabinets which have a width only slightly greater than the width of the step 50.

From the foregoing, it can be seen that there has been provided an improved retractable step assembly and cabinet incorporating same, such that the step assembly is of simple and economical construction and yet is smoothly and easily movable between its extended and retracted positions, is usable with very narrow cabinets, fully supports the step on the floor at all times while at the same time accommodating easy rolling movement of the associated cabinet along the floor, and effectively prevents rolling of the step when a user is standing on it.

We claim:

1. A retractable step assembly comprising: a step, retraction means adapted to be connected to an associated overlying support surface for reciprocating generally horizontal movement between extended and retracted positions, and coupling means extending laterally from said step for coupling said step to said retraction means for movement with said retraction means between said extended and retracted positions, said coupling means including a vertical opening in said step and a bracket connected to said retraction means having a depending flange received in said opening for preventing horizontal movement of said step relative to said retraction means while accommodating vertical movement of said step relative to said retraction means between raised and lowered positions.

2. The step assembly of claim 1, and further comprising bias means for resiliently urging said step to the raised position of said step.

3. The step assembly of claim 1, and further comprising support means on said step for supporting said step on an underlying support surface in both the raised and lowered positions of said step.

4. The step assembly of claim 3, wherein said support means includes bias means for resiliently urging said step to the raised position of said step.

5. The step assembly of claim 1, wherein said retraction means includes a roller slide track assembly.

6. The step assembly of claim 5, wherein said retraction means includes stop means for limiting movement of said retraction means in the extended and retracted positions of said step, and retention means for retaining said step in the retracted position of said step.

7. A retractable step assembly comprising: a step, retraction means adapted to be connected to an associated overlying support surface for reciprocating generally horizontal movement between extended and retracted positions, and coupling means extending laterally from said step for coupling said step to said retraction means for movement with said retraction means between said extended and retracted positions, said coupling means including a vertical opening in said step and a bracket connected to said retraction means having a depending flange received in said opening for preventing horizontal movement of said step relative to said retraction means while accommodating vertical movement of said step relative to said retraction means between raised and lowered positions, first support means depending from said step for rolling engagement with an associated underlying support surface to support said step on the support surface and facilitate rolling movement of said step along the support surface when said step is disposed in the raised position of said step, and second support means depending from said step for frictional engagement with the associated underlying support surface to inhibit movement along the support surface when said step is disposed in the lowered position of said step.

8. The step assembly of claim 7, wherein said first support means includes caster means.

9. The step assembly of claim 8, wherein said caster means includes a plurality of casters at spaced-apart locations on said step.

10. The step assembly of claim 8, wherein said caster means includes bias means for resiliently urging said step to the raised position of said step.

11. The step assembly of claim 7, wherein said second support means includes a plurality of legs which are spaced from the underlying support surface when said step is disposed in the raised position of said step.

12. In a cabinet having support structure for supporting the cabinet a predetermined distance above a floor, the improvement comprising: a retractable step, retraction means connected to the cabinet for reciprocating generally horizontal movement between extended and retracted positions, and coupling means extending laterally from said step for coupling said step to said retraction means for movement with said retraction means between a stowed position disposed underneath the cabinet when said retraction means is in its retracted position and a use position extending from underneath the cabinet when said retraction means is in its extended position, said coupling means including a vertical opening in said step and a bracket connected to said retraction means having a depending flange received in said opening for preventing horizontal movement of said step relative to said retraction means while accommodating vertical movement of said step relative to said retraction means between a raised position freely movable along the floor and a lowered position frictionally engageable with the floor for inhibiting movement along the floor.

13. The cabinet of claim 12, and further comprising support means on said step for supporting said step on the floor in both the raised and lowered positions of said step.

14. The cabinet of claim 13, wherein said support means includes bias means for resiliently urging said step to the raised position of said step.

15. The cabinet of claim 13, wherein said support means includes caster means depending from said step for rolling engagement with the floor to support said step on the floor and facilitate rolling movement of said step along the floor when said step is disposed in the raised position of said step, and legs depending from said step and spaced from the floor when said step is disposed in the raised position of said step and frictionally engageable with the floor to inhibit movement along the floor when said step is disposed in the lowered position of said step.

16. The cabinet of claim 15, wherein said caster means includes bias means for resiliently urging said step to the raised position of said step.

17. The cabinet of claim 15, wherein the cabinet support structure includes roller wheels.

* * * * *